United States Patent [19]
Santos et al.

[11] Patent Number: 5,528,555
[45] Date of Patent: Jun. 18, 1996

[54] SYSTEM AND METHOD FOR COMPENSATING FOR TOWED ARRAY MOTION INDUCED ERRORS

[75] Inventors: Maria C. Santos, Bristol; Sherry E. Hammel, Little Compton; Kai F. Gong, Pawtucket, all of R.I.; Nixon A. Pendergrass, North Dartmouth, Mass.

[73] Assignee: The United States of America as represented by the Secretary of the Navy, Washington, D.C.

[21] Appl. No.: 353,852

[22] Filed: Dec. 9, 1994

[51] Int. Cl.$^6$ .............................. G01V 1/36; G01K 11/16
[52] U.S. Cl. .............................. 367/22; 367/45; 367/106; 367/130; 364/421
[58] Field of Search ............................... 367/21, 22, 45, 367/100, 106, 130; 364/421; 370/79; 324/361

[56] References Cited

U.S. PATENT DOCUMENTS

| | | | |
|---|---|---|---|
| 4,692,909 | 9/1987 | Gard et al. | 367/45 |
| 4,974,212 | 11/1990 | Sheiman | 367/21 |
| 5,251,183 | 10/1993 | McConnell et al. | 367/21 |
| 5,337,366 | 8/1994 | Eguchi et al. | 381/71 |
| 5,386,249 | 1/1995 | Strolle et al. | 348/707 |
| 5,448,531 | 9/1995 | Dragoset | 367/45 |

OTHER PUBLICATIONS

Stalcup et al., J. Atmos. Ocean. Technol., vol. 7, #2, pp. 340–348 Apr. 1990, Abst only herewith.
O'Brien et al, U.S. Pat. Applic. 08/127145 filed Sep. 22, 1993, NTIS AD–016039/0/XAB; abst. only herewith.
Lindren et al., IEEE Comput. Soc. Press, pp. 349–353, Nov. 8, 1985: abst. only herewith.
Graham et al, 1993 IEEE Inter. Conf. on Acoustics, Speech & Signal Proc., Apr. 30, 1993, vol. 1, pp. 285–288; abst. herewith.

Primary Examiner—Nelson Moskowitz
Attorney, Agent, or Firm—Michael J. McGowan; Prithvi C. Lall; Michael F. Oglo

[57] ABSTRACT

A system for compensating for noise induced in a sensor data stream from a sensor array towed by a towing device includes a towing device motion data input receives a towed motion data stream representative of towing motion of the towing device. A sensor array input for receiving the sensor data stream. An adaptive filter connected to the towing device motion data input and the sensor array input for receiving the towed motion data stream from the towing device motion data input and the sensor data stream from the sensor array input and for generating a corrected sensor data stream representing sensor array data with ship motion noise attenuated therefrom.

9 Claims, 3 Drawing Sheets

SYSTEM AND METHOD FOR COMPENSATING FOR TOWED ARRAY MOTION INDUCED ERRORS

STATEMENT OF GOVERNMENT INTEREST

The invention described herein may be manufactured by or for the Government of the United States of America for Governmental purposes without the payment of any royalties thereon or therefor.

BACKGROUND OF THE INVENTION

1. Field of the Invention

The invention relates generally to the field of correction of noise in acoustic signals as received by a towed array in an ocean environment, and more particularly to correction of noise due to variations in the motion of a sensor array due to the dynamics of the ship towing the array.

2. Description of the Prior Art

Analysis of motion of a target in, for example, an ocean environment is performed using data obtained by acoustic sensors organized in an array that is towed through a region of interest. The acoustic sensors detect acoustic (sound) energy in the region, and generate electrical signals in response. The acoustic energy represents acoustic signals originating from the target, as well as usually a considerable amount of noise generated by the ocean itself. The pattern of electrical signals is processed to isolate the portion originating from the target, and the motion of the target can be determined from the processed signals in a conventional manner.

Another source of noise can be from the motion of the towed array itself. The target motion processing generally proceeds under certain assumptions concerning the motion of the array and the towing device, which may not be wholly accurate. To the extent that the array motion is not in accordance with the assumptions, the motion will be reflected in an additional noise component in the signal as generated by the sensors.

SUMMARY OF THE INVENTION

It is therefore an object of the invention to provide a new and improved system and method for compensating for errors induced in signals from towed arrays induced by motion of the towing ship.

In brief summary, the invention provides a system for compensating for noise induced in a sensor data stream from a sensor array towed by a towing device. The system includes a towing device motion data input, a sensor data input and an adaptive filter. The towing device motion data input receives a towed motion data stream representative of towing motion of the towing device. The sensor array input receives the sensor data stream. The adaptive filter connected to the towing device motion data input and the sensor array input for receiving the towed motion data stream from the towing device motion data input and the sensor data stream from the sensor array input and for generating a corrected sensor data stream representing sensor array data with ship motion noise attenuated therefrom.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DESCRIPTION OF THE PREFERRED EMBODIMENT

Figure 1:
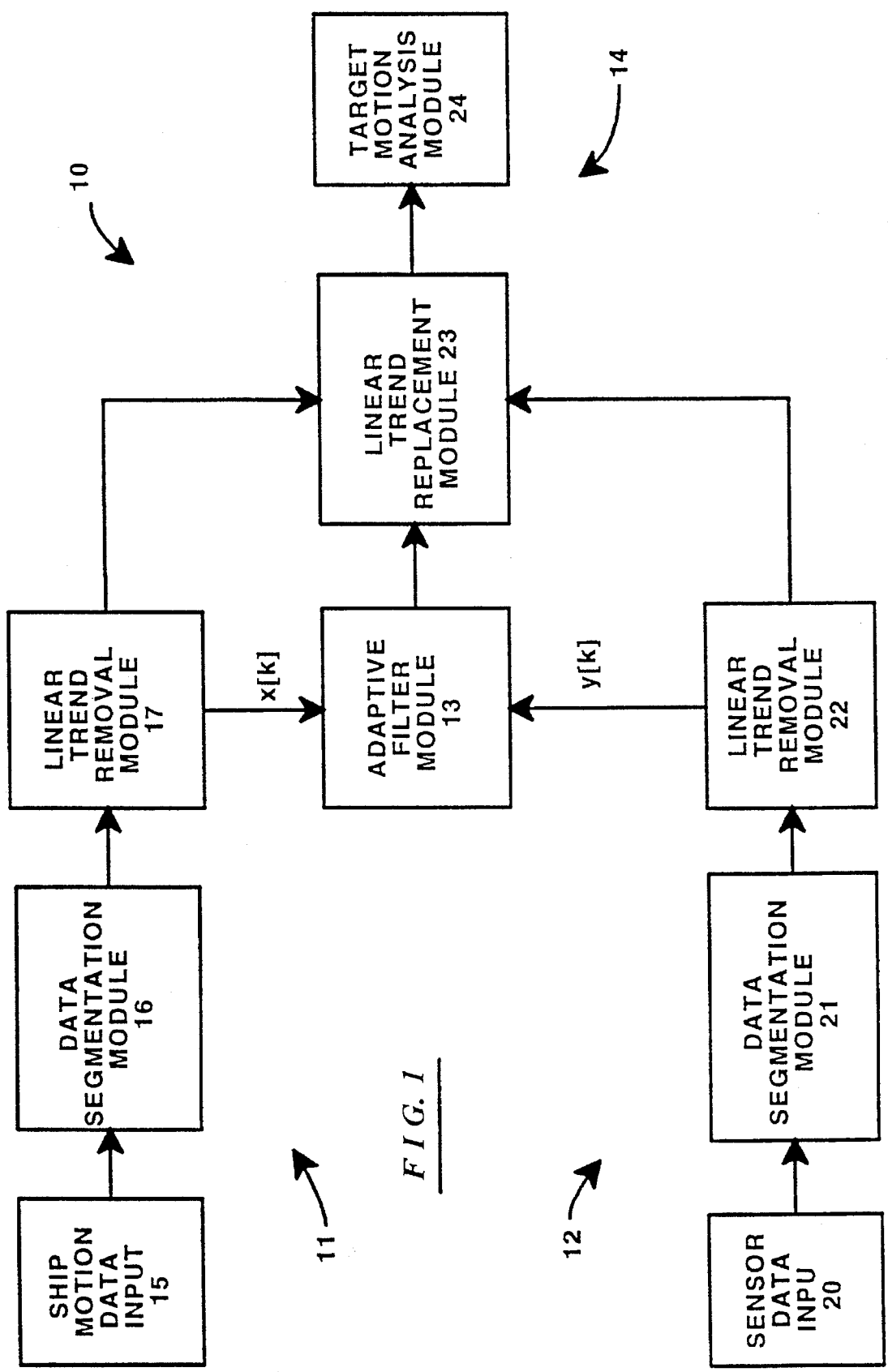
FIG. 1 is a functional block diagram of a towed array motion noise compensation system constructed in accordance with the invention.

FIG. 1 is a functional block diagram of a towed array motion noise compensation system 10 constructed in accordance with the invention. The system 10 is for use in connection with an acoustic sensor array (not shown) that is towed in an ocean environment by a towing device such as a ship (also not shown), and generates information for compensating for motion of the ship from a path having predetermined motion characteristics.

With reference to FIG. 1, the towed array motion noise compensation system 10 includes a ship motion input element 11, a sensor input element 12, an adaptive filter module 13, and an output processing element 14. Generally, the ship motion input element 11 receives and performs preliminary processing in connection with a data stream describing the motion of the ship and generates a processed ship data stream x[k] in response. Similarly, the sensor input element 12 receives and performs preliminary processing in connection with a data stream from the sensor array (not shown), the sensor input element 12 generating a processed sensor data stream y[k] in response. The processed ship data stream x[k] from the ship motion input element 11 and the processed sensor data stream y[k] from the sensor input element 12 are coupled to the adaptive filter module 13, which processes the data streams to generate a corrected data stream e[k], reflecting the data stream from the sensor array with the ship motion noise being substantially attenuated. The adaptive filter module 13 will be described in more detail below in connection with FIGS. 2 and 3. Finally, the output processing element 14 processes the corrected data stream and uses it in target motion analysis in a conventional manner.

More specifically, the ship motion input element 11 includes a ship motion data input module 15, a data segmentation module 16 and a linear trend removal module 17. The ship motion data input module 15 receives and records information regarding ship motion. The ship motion information may include, for example, such kinematic information as course and speed and deviations from a predetermined course and speed. The ship motion data recorded by the ship motion data input module 15 is in the form of a ship data stream S[k] sampled and recorded at successive points in time "k." The data segmentation module 16 divides the ship data stream S[k] into a series of segments $S[0]-S[K_1]$, $S[K_1+1]-S[K_2]$, . . . , according to criteria which will be described below.

The data segmentation module 16 transfers the data stream $S[K_a]-S[K_b]$ comprising each segment of ship motion data to the linear trend removal module 17. The linear trend removal module 17, in turn, processes the segment to identify and remove a linear component in the data stream to generate the processed ship data stream x[k] with index "k" representing points in time represented by the respective elements of the data stream. The linear component can be identified by, for example, fitting the data stream in the segment to a linear curve L[k] by any conventional curve-fitting arrangement, and the linear trend removal module 17 can perform the correction by taking the difference between each data sample S[k] in the sample and the value of the linear curve L[k] at the particular point "k," the result being the processed ship data stream x[k].

Similarly, the sensor input element 12 includes a sensor data input module 20, a data segmentation module 21 and a linear trend removal module 22. The sensor data input module 20 receives and records sensor data from the towed sensor array (not shown) in a conventional manner. The sensor data recorded by the sensor data input module 20 is in the form of a sensor data stream E[k] sampled and recorded at successive points in time "k," with the like values of index "k" for the ship motion data stream and the sensor data stream representing like points in time. The data segmentation module 21 divides the sensor stream E[k] into a series of segments E[0]–E[$K_1$], E[$K_1$+1]–E[$K_2$], . . . , according to the same segmentation criteria as used in connection with the ship motion data.

The data segmentation module 21 transfers the data stream E[$K_a$]–E[$K_b$] comprising each segment to the linear trend removal module 22. The linear trend removal module 22, in a manner similar to linear trend removal module 17, processes the segment to identify and correct for a linear component in the data stream to generate a processed sensor data stream y[k] with index "k" representing successive points in time. As with the linear trend removal module 17, the linear trend removal module 22 can identify the linear trend component by fitting the data stream in the segment to a linear curve L[k] by any conventional curve-fitting arrangement, and can perform the correction by taking the difference between each data sample E[k] in the segment and the value of the linear curve L[k] at the particular point "k," the result being the processed sensor data stream y[k].

As noted above, the data segmentation modules 16 and 21 of the ship motion input element 11 and the sensor input element 12 segment the respective data streams they receive from their respective ship motion data input module 15 and sensor data input module 20. The segmentation is generally arbitrary with the following characteristics:

1. each segment represents a data stream taken over a relatively long time interval, but without a change in course by either the ship (for the ship motion input element 11) or target (for the sensor input element 12),
2. each segment represents data with a single signal propagation mode (for the sensor input element 12); and
3. segments represent data sampled at a selected maximum sampling rate, in one embodiment selected to be one second. If there are gaps in the data stream, they are set to a very large delay in one embodiment, so that the portion of the data stream after the delay will effectively comprise another segment separate and apart from that prior to the gap.

The adaptive filter module 13 receives the processed ship motion data segments x[k] from the ship motion input element 11, and the processed sensor data segments y[k] from the sensor input element 12, and generates in response corrected sensor data output segments e[k], representing, except for a linear component to be restored by the output processing element 14 as described below, the sensor data as corrected for ship motion noise. The operations of the adaptive filter module 13 will be described in detail below in connection with FIGS. 2 and 3.

The adaptive filter module 13 couples the corrected sensor data output segments e[k] to the output processing element 14. The output processing element 14, in particular the linear trend replacement module 23, receives the linear component information from the linear trend removal modules 17 and 22, respectively, and processes the data output segments e[k] in response thereto, effectively restoring a linear component. The result is a data stream D[k] corresponding to the sensor data stream E[k], but with the ship motion error attenuated or removed. The linear trend replacement module 23 couples the processed data stream D[k] to a target motion analysis module 24, which processes the processed data stream D[k] to perform target motion analysis in a conventional manner.

Figure 2:
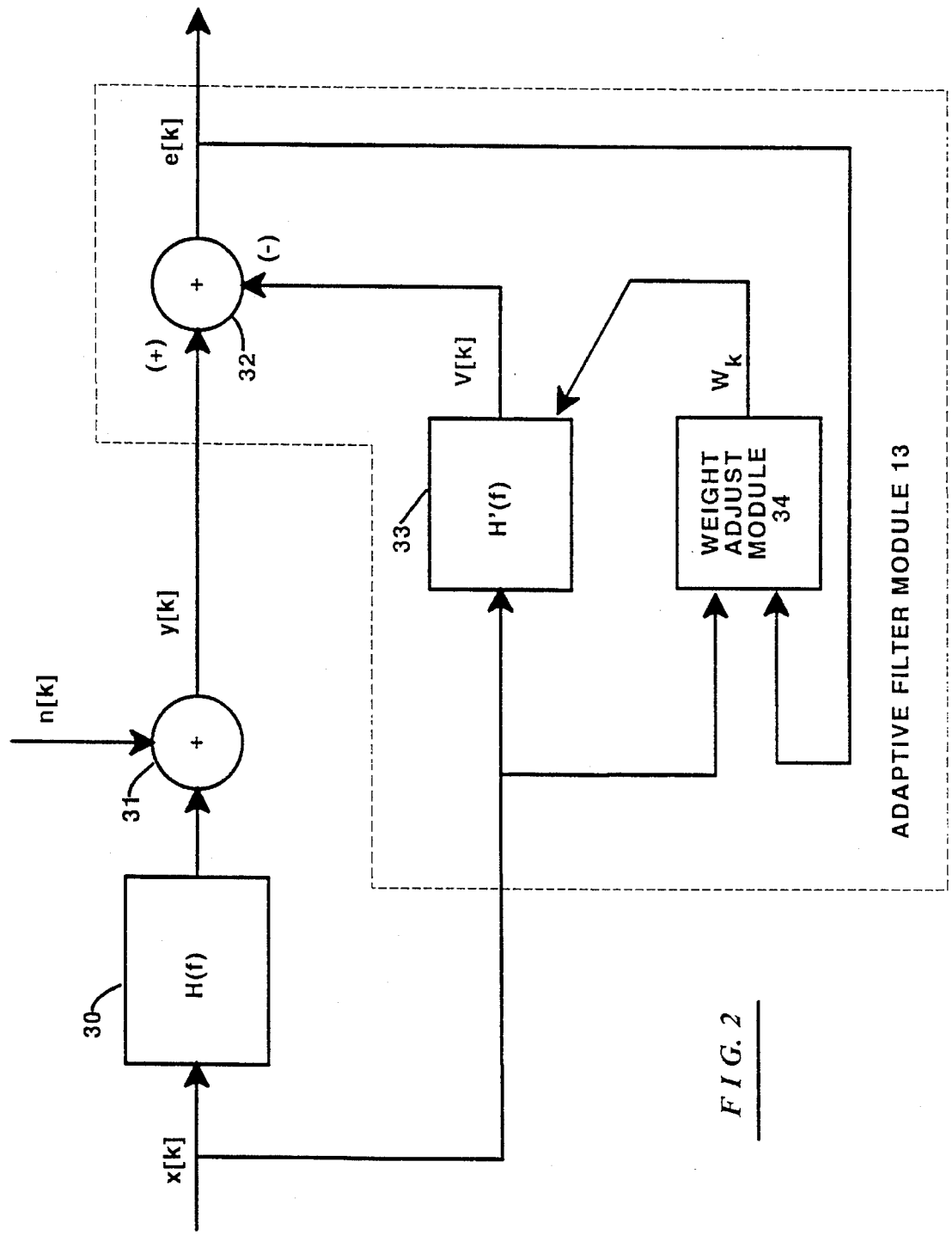
FIG. 2 is a functional block diagram of a portion of the system depicted in FIG. 1, directed primarily to the adaptive filter portion of the system.

As noted above, the adaptive filter module 13 processes the processed ship motion data segments x[k] and the processed sensor data segments y[k] and generates corrected sensor data output segments e[k], representing, except for a linear component, the sensor data as corrected for noise induced in the sensor data due to motion of the towing ship. The operations performed by the adaptive filter module 13 will be described in connection with FIG. 2. With reference to FIG. 2, preliminarily, it is assumed that the error in the sensor data stream y[k] is a function of the ship motion error, as represented by the ship motion data stream x[k], as well as a noise component n[k] representing other noise, such as noise from the ocean environment, that is separate and distinct from the noise component provided by ship motion. More specifically, it is assumed, first, that the error in the sensor data stream y[k] is represented by the ship motion data stream x[k] as processed by an unknown transfer function H[f], represented by block 30 in FIG. 2, and, second, that the output of the transfer function block 30 (effectively the multiplicative product of the transfer function H[f] and the ship motion data stream x[k]) is added to the noise component n[k] to provide the sensor data stream error. The addition of the output of the transfer function block 30 and the noise component n[k] is represented by an adder 31. (It should be noted that the elements 30 and 31 are not, in fact, components of the system 10; these elements are shown in FIG. 2 to illustrate the sources of error for which the system 10 corrects.)

The adaptive filter module 13 depicted in FIG. 2 determines a filter transfer function H'[f] that is applied to the corrected ship motion data segments x[k] to correct for the ship motion error, and uses the filter transfer function H'[f] and the values of the corrected ship motion data segment x[k] to generate correction values V[k] that an adder 32 applies to correspondingly-indexed values of the corrected sensor data segment y[k] to generate values for a filtered sensor data segment e[k].

With this background, the adaptive filter module 13 includes, in addition to the adder 32, a filter module 33 that effectively generates the correction values V[k] in response to the corrected ship motion data segment x[k] and weighting values w(1). The filter module 33 will be described in more detail below in connection with FIG. 3. Briefly, the filter module 33 generates the correction values V[k] for each index "k" as $$V[k] = W_k^T X_k \qquad (1),$$

where $X_k$ corresponds to $$X_k = \begin{bmatrix} x[k] \\ x[k-1] \\ \cdot \\ \cdot \\ \cdot \\ x[k-L+2] \end{bmatrix} \qquad (2)$$

and $W_k$ corresponds to $$W_k = \begin{bmatrix} w(0) \\ w(1) \\ \cdot \\ \cdot \\ \cdot \\ w(L-1) \end{bmatrix} \qquad (3)$$

represent a series of weighting values w(1), with "L" corresponding to the number of weights.

The adder 32 receives the output values V[k] from the filter module 33 for successive values of index "k", and generates the values for the filtered sensor data segment e[k] as $$e[k]=y[k]-V[k] \qquad (4),$$

for each value of index "k".

Figure 3:
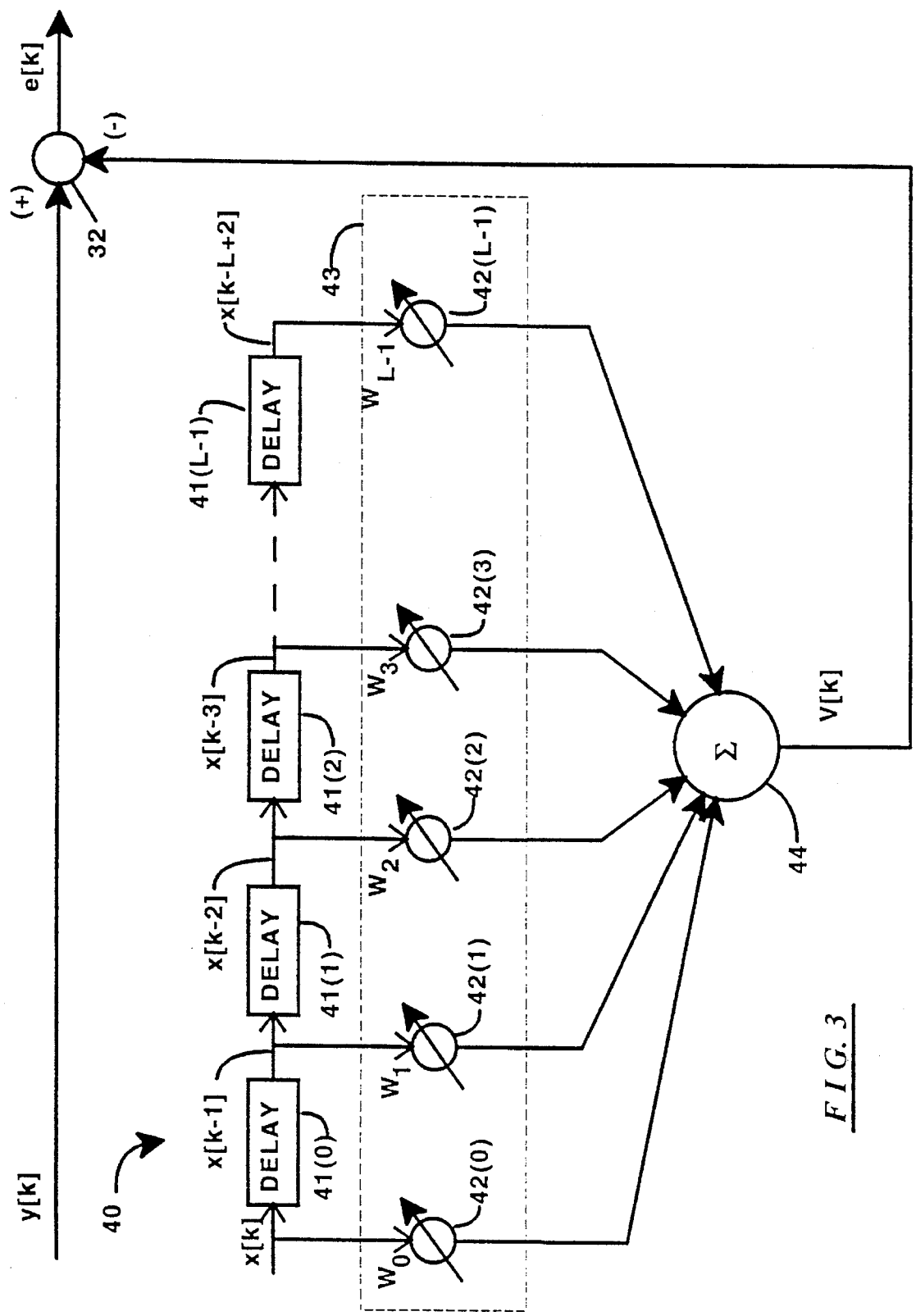
FIG. 3 is a functional block diagram of a portion of the adaptive filter portion depicted in FIG. 2.

As noted above, the structure of filter module 33 is depicted in FIG. 3. With reference to FIG. 3, the filter module 33 effectively includes a delay line 40 comprising a plurality of delay elements 41(1) through 41(L-1) (generally identified 41(1)), a plurality of weighting elements 42(0) through 42(L-1) forming a weight bank 43, and a summing element 44. The delay line 40, in each successive step in processing the segments of processed ship motion data x[k] and processed sensor data y[k], receives and stores one of a series of values of a segment of the processed ship motion data segment x[k] at the first delay element 41(1), and, for each step, transfers the previously-received values for storage in successive delay elements 41(2) through 41(L-1) in the delay line 40. Thus, at the first step for a segment, all of the delay elements 41(1) will be empty, and the first value x[0] of a segment will be situated at the input of the first delay element 41(1). At the next step, the first delay element 41(1) will latch the first value x[0], and the second value x[1] will be situated at the input of the first delay element. When a delay element 41(1) latches a value, it effectively provides the value at its output, and so at this point the delay element 41(1) will effectively be providing the value x[0] at its output. Accordingly, at the next step, the second delay element 41(2) will latch the first value x[0] and provide it at its output, the first delay element 41(1) will latch the second value x[1] and provide it at its output, and the third value will be present at the input to the first delay element 41(1). The delay line 40 will repeat this process at each successive step. Accordingly, if there are "L-1" delay elements 41(1) (since the delay line 40 will contains one delay element 41(1) less than "L," the number of weighting elements) if the successively-indexed values x[k] through x[k–L+2] of the processed ship motion data segment x[k] are distributed over the successively-indexed delay elements 41(1) through 41(L-1) at one step, with value x[k–L+2] being provided at the input to delay element 41(1), in the next step the successively-indexed delay elements 41(1) through 41(l-1) will contain values x[k] through x[k–L+2].

As noted above, the filter module 33 also includes a plurality of weighting elements 42(0) through 42(L-1). Each of weighting elements 42(0) through 42(L-1) is multiplied by the value at the input of the correspondingly-indexed delay element 41(0) through 41(L-1). Each weighting element 42(1), for indices 1=0 through 1=L-1, receives the value x[k] at the input of the correspondingly-indexed delay element 41(1). Each weighting element 42(1) generates an output that is a function of the multiplicative product of the value x[k] it receives from the delay line and a weighting value w(1), that is x[k]w(1). The summing element 44, in turn, receives the output values x[k]w(1) generated by all of the weighting elements 42(1) and the delay elements 41(1), and in turn generates an output V[k] that is the sum of the output values, corresponding to equation 1, above.

It has been found that the filter module 33 can operate suitably in the system 10 with between fifty and one hundred and fifty delay elements 41(1), with a related number of weighting elements 42(1). In one particular embodiment, it has been found that the operation of the filter module 33 was relatively constant with a number of weighting elements 42(1) in excess of around sixty, and in that embodiment approximately one hundred was selected as a reasonable compromise between the accuracy of the estimate of the transfer function H'(f) and the length of the filter's settling time.

Returning to FIG. 2, the adaptive filter module 13 further includes a weight adjustment module 34 that adjusts the weighting values w(1) of the weighting elements 42(1) of the filter module 13 in response to their respective current weighting values, the ship motion data segment x[k] and the filtered sensor data segment e[k]. In particular, the weight adjustment module generates a weighting value w(k+1) as $$w[k+1] = w[k] + \frac{2u}{L\hat{\sigma}^2} e[k]X[k], \qquad (5)$$

where W(0) is zero, "u" is a step size constant (selected to have the value 0.01 in one embodiment), "1" is the number of weights and $\hat{\sigma}^2$ is an estimate of the standard deviation of the values of the elements x[k] through x(x–L+2) of $X_k$ (equation 2).

To ensure the convergence of the weights w(1) of the filter module 33 by the weight adjustment module 34, it is generally preferable that a number of values of the processed ship motion data segment x[k] be processed. This raises two potential problems for the estimation process, because the segments will generally be expected to be relatively short, and long settling times for the weights could prevent the filter module 33 to provide reasonable estimates of the transfer function H(f) at various times.

Returning to FIG. 1, as noted above, the output values generated by the adaptive filter module 13 are coupled to the linear trend replacement module 23, which processes them in response to linear values it receives from the linear trend removal modules 17 and 22 from the ship motion input element 11 and sensor input element 12, respectively, to restore a linear component to the values received from the adaptive filter module. The result is then coupled to a target motion analysis module 24 for processing in a conventional manner.

It will be appreciated that, in one particular embodiment, removal of the linear component in modules 17 and 22, is performed to facilitate more rapid and accurate adaptation by the adaptive filter module 13 to the data streams x[k] and y[k] provided thereto.

It will be appreciated by those skilled in the art that the towed array motion compensation system 10 in accordance with the invention can be implemented using special purpose hardware, or it may be implemented using a suitably programmed general purpose computer, and that either such implementation is well within the skill of those in the art.

The preceding description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A system for compensating for noise induced in a sensor data stream from a sensor array towed by a towing device comprising:

a towing device motion data input for receiving a towing motion data stream representative of towing motion of the towing device;

a sensor array input for receiving the sensor data stream each of said towing device motion data input and said sensor array input including a data segmentation module for dividing the towing motion data stream and the sensor data stream into a series of segments; and an adaptive filter connected to the towing device motion data input and the sensor array input for receiving the towing motion data stream from the towing device motion data input and the sensor data stream from the sensor array input and for generating a corrected sensor data stream representing sensor array data with towing device motion noise attenuated therefrom, the adaptive filter operating in connection with each segment separately.

2. A system as defined in claim 1 in which the data segmentation module of the towing device data input generates each segment representing the towing motion data stream over a relatively long time interval over which the towing device maintains a constant course.

3. A system as defined in claim 1 in which the data segmentation module of the sensor data input generates each segment representing the sensor data stream over a relatively long time interval over which a contact maintains a constant course.

4. A system as defined in claim 1 in which the towing device motion data input further includes a towing data linear trend removal module for receiving each towing motion data stream segment, identifying a linear component and generating a processed towing motion data stream segment in which the linear component has been removed from the towing motion data stream segment, the towing motion data input coupling the processed towing motion data stream segment to the adaptive filter, the adaptive filter using the processed towing motion data stream segment in generating the corrected sensor data stream.

5. A system as defined in claim 4 further including a linear trend replacement module for receiving the corrected sensor data stream from the adaptive filter and linear component information from the towing data linear trend removal module and for generating in response a processed corrected sensor data stream including the linear component removed by the towing data linear trend removal module.

6. A system as defined in claim 1 in which the sensor data input further includes a sensor data linear trend removal module for receiving each sensor data stream segment, identifying a linear component and generating a processed sensor data stream segment in which the linear component has been removed from the sensor data stream segment, the towing motion data input coupling the processed sensor data stream segment to the adaptive filter, the adaptive filter using the processed sensor data stream segment in generating the corrected sensor data stream.

7. A system as defined in claim 6 further including a linear trend replacement module for receiving the corrected sensor data stream from the adaptive filter and linear component information from the sensor data linear trend removal module and for generating in response a processed corrected sensor data stream including the linear component removed by the sensor data linear trend removal module.

8. A system as defined in claim 1 in which the adaptive filter includes:

a filter module for receiving the towing motion data stream and for generating a correction data stream in response to successive values of the towing motion data stream and a set of weighting values, wherein said filter module generates the correction values V[k] for each index "k" as $$V[k] = W_k^T X_k,$$

where $X_k$ corresponds to $$X_k = \begin{bmatrix} x[k] \\ x[k-1] \\ \cdot \\ \cdot \\ \cdot \\ x[k-L+2] \end{bmatrix},$$

x[k] corresponding to successive values of the towing motion data stream, and $$W_k = \begin{bmatrix} w(0) \\ w(1) \\ \cdot \\ \cdot \\ \cdot \\ w(L-1) \end{bmatrix},$$

representing a series of weighting values, with "L" representing the number of weighting values;

an adder for receiving the correction data stream and the sensor data stream and generating an error value stream in response; and a weights adjustment module for adjusting the weighting values of the filter module in response to the error value stream.

9. A system as defined in claim 8 in which said weights adjustement module generates weight adjustment values for adjusting the weighting values of the filter module as $$w[k+1] = w[k] + \frac{2u}{L\hat{\sigma}^2} e[k]X[k],$$

where W(0) is zero, "u" is a step size constant relating to the time between samples, "L" is the number of weights and $\hat{\sigma}^2$ is an estimate of the standard deviation of the values of the towing device motion data stream.

* * * * *